Patented Apr. 20, 1937

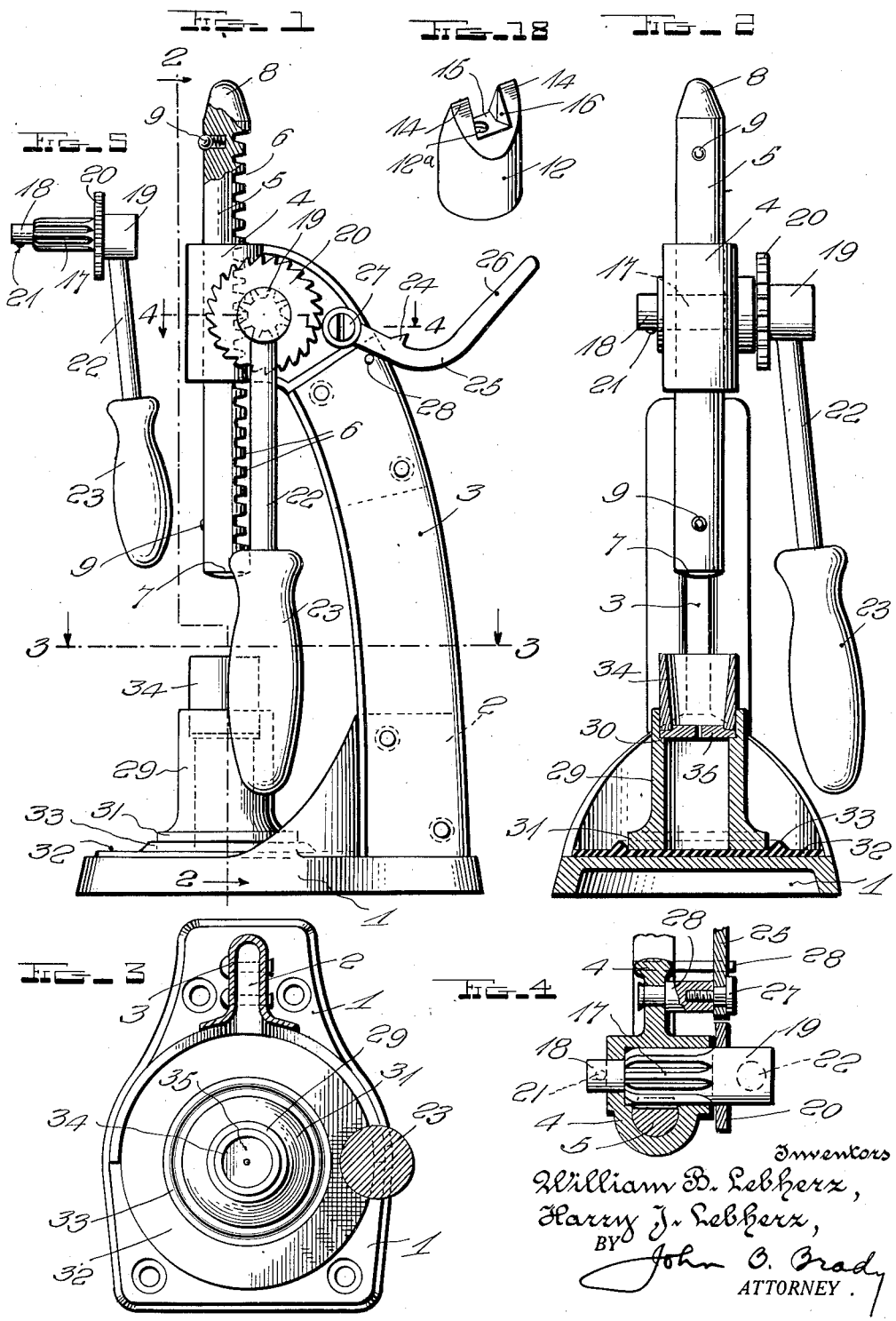

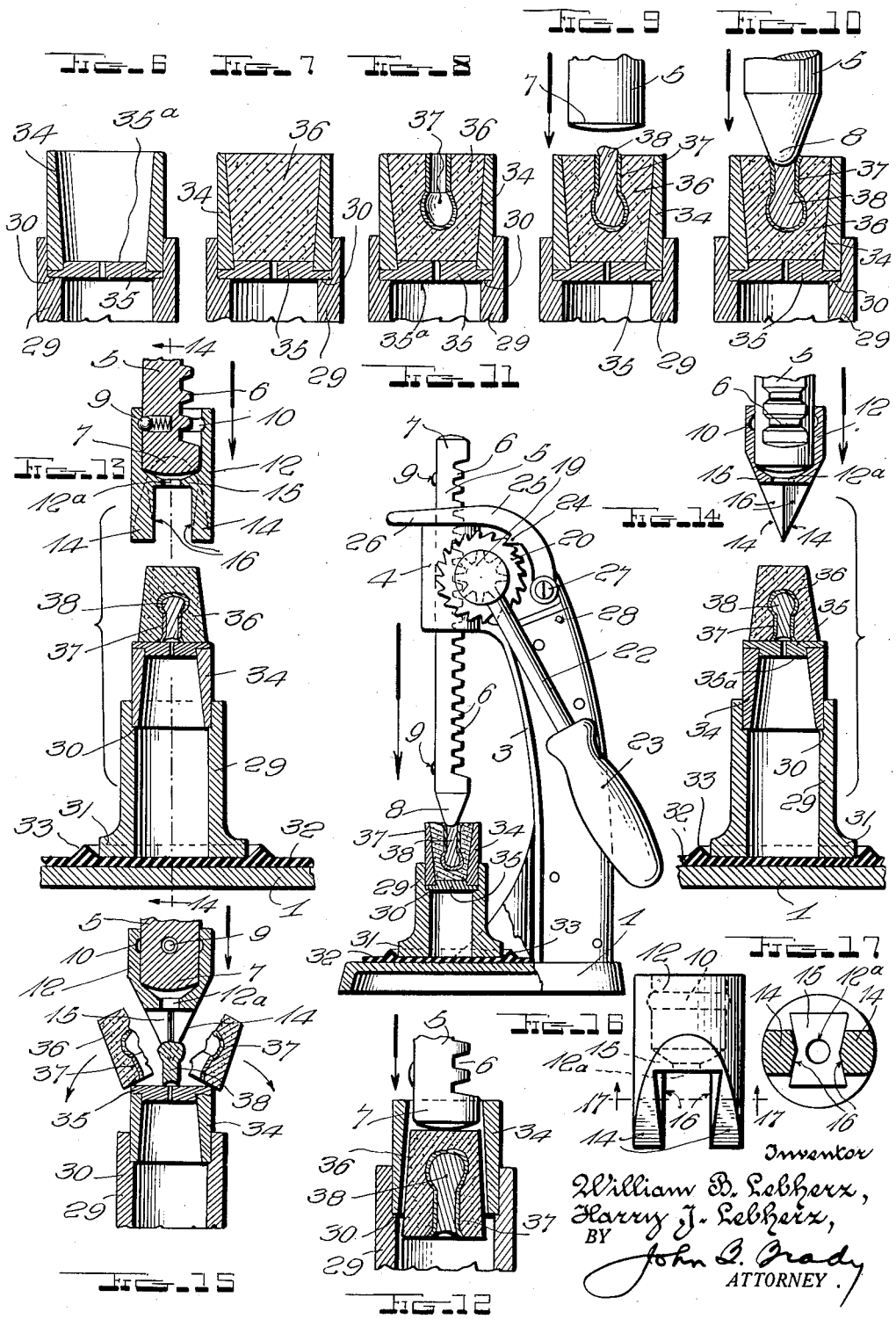

2,077,423

UNITED STATES PATENT OFFICE 2,077,423

APPARATUS FOR MAKING DENTAL AMALGAM AND OTHER DIES

William B. Lebherz and Harry J. Lebherz, Frederick, Md., assignors, by mesne assignments, to John B. Brady, Washington, D. C.

Application July 15, 1933, Serial No. 680,646

9 Claims. (Cl. 32—40)

Our invention relates broadly to apparatus for making dental amalgam and other dies and more particularly to the construction of a press and mold splitter for use in the dental art.

One of the objects of our invention is to provide a construction of press and mold splitter which may be conveniently used by dental technicians in the making of dental amalgam and other dies with means for passing excessive quantities of mercury from the amalgam and subsequently, by use of the same tool, breaking the molded material from the die.

Another object of our invention is to provide a construction of press for use in making dental amalgam and other dies wherein sufficient resiliency is provided in the press to allow the press to be set with respect to a dental mold under a predetermined tension for expressing from the mold excessive mercury.

Still another object of our invention is to provide a construction of press for making dental amalgam and other dies in which a ram member is arranged to serve a multiplicity of functions, that is as an element for ramming the dental mold, ejecting the mold from the investment ring, expressing excess mercury from the amalgam die, and subsequently splitting the molded material from the die.

A further object of our invention is to provide a construction of tool for making dental amalgam and other dies which employs a ram member which is reversible in position for performing a multiplicity of different functions in the making of the dental die, including the ramming of the mold, the ejecting of the mold from the investment ring, the expressing of excess mercury from the amalgam die, and the splitting of the molded material from the die.

A still further object of our invention is to provide a construction of dental tool for making dental amalgam and other dies having means for positively adjusting the ram in predetermined position with respect to the dental mold.

Another object of our invention is to provide a construction of dental tool for making dental amalgam or other dies which employs a mold splitter recessed to bridge the die in the mold and having wedge-like splitting faces thereon for cutting the molded material from the die.

Other and further objects of our invention reside in the construction of dental tool for making dental amalgam and other dies, and in the construction of the mold splitter and the arrangement of the several parts of the tool as set forth more fully in the specification hereinafter following by reference to the accompanying drawings, in which:

Figure 1 is a side elevation of the tool of our invention for making dental amalgam or other dies; Fig. 2 is a front elevational view thereof; Fig. 3 is a horizontal sectional view taken on line 3—3 of Fig. 1; Fig. 4 is a horizontal sectional view on line 4—4 of Fig. 1; Fig. 5 is a detailed side elevation of the operating gear and associated parts; Fig. 6 is a detailed sectional view of the investment ring to be filled with a cementitious aggregate; Fig. 7 is a similar view showing the cup filled with cementitious aggregate, the latter being in a plastic state; Fig. 8 is a similar view showing the tooth impression mold inserted in the plastic mass; Fig. 9 is a similar view showing the mold filled with amalgam and also disclosing the manner of freeing this amalgam of superfluous mercury by means of pressure of the descending slightly rounded head of the plunger; Fig. 10 is a similar view showing the plunger reversed and forced downwardly, thus forming a cavity in the mold and freeing the amalgam of every vestige of superfluous mercury to hasten the hardening process; Fig. 11 is a side elevation of the device complete, showing the plunger locked in position by the pawl and ratchet for exerting pressure upon the amalgam body, the rubber cushion supporting the anvil being slightly compressed and the entire frame structure exerting additional downward tension on the plunger by means of the ratchet gear; Fig. 12 is a fragmentary sectional view showing the slightly rounded head of the plunger ejecting the molded unit containing the amalgam die, now thoroughly hardened, from the investment ring; Fig. 13 is a fragmentary sectional view showing the block of cementitious aggregate surrounding the molded die about to be split by the wedge-like faces of the splitting sleeve; Fig. 14 is a sectional view taken on line 14—14 of Fig. 13; Fig. 15 is a fragmentary sectional view showing the action of the descending wedge in splitting the block of cementitious aggregate into fragments; Fig. 16 is a side elevation of the splitting wedge; Fig. 17 is a horizontal sectional view taken on line 17—17 of Fig. 16; and Fig. 18 is a perspective view of the splitting wedge.

Our invention resides in the construction of a dental tool for making dental amalgam and other dies and contemplates the arrangement of a resilient ram support and a resilient base support for mounting an investment ring in such a position that there is substantial elasticity in the press when the press is set in a predetermined position for expressing from the dental die excess mercury preparatory to the hardening operation. We provide a press having an adjustable ram therein which is controlled by a hand actuator having a gear connection with rack teeth formed in the ram with a pawl and ratchet mechanism associated with the gear connection in such manner that the ram may be maintained in a predetermined position under tension. The ram is made reversible in position so that the opposite ends thereof may be employed for a multiplicity of different functions during the operation of the tool. One end of the ram is shaped with a plunger head which is adapted to be used under pressure for packing an investment ring during the filling operation and subsequently, after the setting of the amalgam die, for ejecting the mold from the investment ring. The plunger head is so shaped that a mold splitter may be readily attached thereto and used for breaking the material of the mold from the dental die after the die has thoroughly hardened. The opposite end of the ram is provided with a tapered terminus adapted to be pressed into engagement with the dental mold for expressing from the die excess mercury. The tapered end of the ram is also provided with means for receiving and retaining the mold splitter when it is desired to apply the mold splitter to the tapered end of the ram.

Our invention does not include the structure of the investment ring, the removable end member thereon, the feature of reversibility of the investment ring, the method of packing the investment ring or the method of removing the mold from the investment ring, but resides particularly in the structure of the tool, mold splitter and the multiple function arrangement of the ram, as will be set forth more fully by detailed reference to the drawings.

Referring to the drawings in detail, reference character 1 designates the base of the dental tool which is provided with a vertically disposed rearwardly extending portion 2 to which there is attached a standard 3 which is U-shaped in cross section as shown in Fig. 3 and formed from a blank of resilient sheet metal. The upper portion of the standard 3 is curved to a position over base 1. The upper portion of standard 3 supports the head 4 having a vertically disposed cylindrical portion which has its axis directly aligned with the central portion of the base 1. The cylindrical portion of the head 4 receives the ram 5 which is provided at one side thereof with rack teeth 6. The ram 5 has a plunger head 7 at one end thereof which is slightly rounded and a tapered head 8 at the opposite end thereof. The ram 5 is provided with a spring pressed ball connecter 9 adjacent each end thereof, which connecter is adapted to snap into an annular groove 10 formed in the mold splitter 12 shown more particularly in Figs. 16 and 17. The mold splitter 12 is provided with a pair of wedge-shaped chisel like cutting projections 14 separated by an intermediate bridge portion 15. Each of the chisel like cutting projections 14 has the interior face thereof cut and formed on an angular inclination indicated by reference character 16 so that there is no tendency for the material of the mold to bind between the chisel like cutting projections 14. The actuator for the plunger 5 comprises a gear 17 formed on a shaft 18 which extends through the head 4 on an axis normal to the axis on the ram 5. The shaft member 18 has an enlarged head 19 on one end thereof. A ratchet wheel 20 is secured over the head 19 of shaft 18 in a position immediately adjacent the gear teeth 17. The shaft 18 is provided with a spring pressed ball member 21 therein which serves as a retaining means for maintaining the shaft in position while permitting the ready insertion or withdrawal of the shaft 18 from the head 4. The head 19 also provides means for attachment of the actuating lever 22 to which there is secured the operating handle 23. The ratchet wheel 20 has a pawl 24 directly associated therewith. Pawl 24 is formed on lever member 25 which has an arm 26 thereon for allowing the pawl 24 to be raised out of engagement with the ratchet wheel 20 or moved into engagement with the ratchet wheel 20 when the ram 5 is in a desired position. The lever 25 is pivoted at 27 to a laterally extending member 28 which projects from the head 4 of the standard. The pivotal connection at 27 is so constructed that lever 25 is free to be moved from the disengaged position illustrated in Fig. 1 to the engaged position illustrated in Fig. 11. A stop 28' is carried by the stand 3 for limiting the rearward movement of the lever 25.

Reference character 29 designates a cylindrical support which is provided with an internal shoulder at 30 forming the base of an annular recess in the support 29. A flange 31 is provided on the base of the support 29 for forming a substantial mounting for the support 29. The flange 31 rests directly upon the resilient pad 32 on base 1 and is centered by means of the annular rib 33 in the pad 32. The dental investment ring is shown at 34 mounted with respect to the support 29. As shown in Fig. 6, the removable base member 35 is first mounted upon the shoulder 30 of the cylindrical support 29. The plate 35 is provided with an upstanding central portion 35a around which the smaller end of the investment ring 34 fits as the investment ring is mounted in the annular recess in the upper end of the support 29. As shown in Fig. 6 the investment ring 34 is first placed in a position with the end of the smallest diameter mounted directly upon the support 29 and is thus prepared to receive the plastic mass of material 36 which is filled into the investment ring 34 resting upon plate 35 as shown in Fig. 7. In the plastic condition, the wax cast 37 of the tooth from which the die is to be formed is placed in the plastic mass 36 as represented in Fig. 8. When the plastic mass 36 has hardened, the amalgam 38 is introduced into the wax cast 37 as shown in Fig. 9. The assembly is now ready for the press. By using the rounded end 7 of the ram 5 excess mercury is pressed from the amalgam 38 by the operation represented generally in Fig. 9. The excess mercury rolls off the top of the mold and is removed from the investment ring. However, in order to eliminate free mercury to as large an extent as possible I reverse the ram 5 by withdrawing shaft 18 with its attached gear 17, head 19, actuating lever 22 and operating handle 23, withdrawing the ram 5 and re-inserting the ram in the opposite direction to bring the tapered end 8 into the position illustrated in Figs. 10 and 11. In this position the tapered nose 8 of the ram 5 tends to press the amalgam into the wax cast 38 with great firmness at the same time expelling from the amalgam substantially all of the free mercury. In this operation the resilient pad 32 is compressed downwardly and by reason of the fact that the standard 3 possesses a substantial amount of resiliency by reason of the springiness of the metal of the standard under the pressure of back tension, tends to force the tapered nose 8 of the ram 5 toward the amalgam 38. The pawl 24 is locked in position with respect to the ratchet wheel 20 when the ram has been moved to a desired set position and the rounded nose of the tapered end of the ram 5 is then subjected to continuous pressure directed into the amalgam 38 for shaping the amalgam to the wax cast 37 and expelling excess mercury therefrom.

When the amalgam die has hardened the press may be released and the ram 5 elevated by movement of lever 22. The amalgam is then allowed to set. When completely set, the investment ring 34 is removed from the support 29, the plate 35 removed and the investment ring re-inserted in its reversed position in the support 29 as shown in Fig. 12. The ram 5 is reversed so as to bring the rounded end 7 thereof to a position in which it is used, as illustrated in Fig. 12, for ejecting the hardened molded mass from the investment ring by downward pressure as shown in Fig. 12. The hollow construction of the support 29 allows the mold to be readily knocked out of the investment ring. The draft of the mold with respect to the investment ring is such that pressure on ram 5 tends to knock the mold free of the investment ring.

The mold may now be moved to a position on top of plate 35 which is fitted upon the smaller end of the investment ring in the position shown in Figs. 13, 14 and 15. The mold splitter 12 is next brought into operation. The ram 5 is sufficiently elevated to enable the mold splitter 12 to be telescopically moved into position over the rounded end 7 of the ram 5 and locked in position when engagement of the annular groove 10 therein with the spring pressed ball 9. The wedge shaped chisel like cutting projections 14 of the mold splitter extending from the bridge portion 15 have angularly shaped interior faces so that there is no danger of injury to the hardened die 38 by application of pressure of the mold splitter against the mold. The mold splitter has an aperture 12a in the bridge portion 15 which allows entrapped air to rapidly escape when the mold splitter is placed in position on the end of the ram 5. The mold splitter is brought down against the mold 36 as shown in Figs. 13 and 14. The wedge shaped chisel like cutting projections 14 enter the material of the mold as shown in Fig. 15. The material of the mold shown at 36 is broken into fragments by the chisel like cutting projections 14 of the mold splitter, freeing the die 38 from the mold for subsequent dental operations. The angularly disposed interior faces 16 of the chisel like cutting projections represented at 14 preclude the accumulation of the material broken from the mold within the bridge like portion 15 and thereby enables the mold splitter to be used for rapidly cutting away the molded material about the die. The operations of removing the hardened mass from about the die have heretofore been extremely tedious and time consuming and we have found that the mold splitter constructed in accordance with the structure illustrated herein is highly convenient and efficient in its operation.

While we have described our invention in one of its preferred embodiments, we desire that it be understood that modifications may be made and that we intend no limitations upon the structure of the device except as are imposed by the scope of the appended claims.

What we claim as new and desire to secure by Letters Patent of the United States is as follows:

1. Apparatus for making dental amalgam and other dies, comprising a base, a standard connected with said base, a ram projectable through the upper end of said standard and movable toward or away from a mold encasing a dental die supported with respect to said base, a cutting head carried by said ram and having a pair of spaced chisel-like cutting members for breaking portions of the mold away from opposite sides of the dental die, and means engageable with said ram for forcing said cutting head against the mold.

2. Apparatus for making dental amalgam and other dies, comprising a base, a standard connected with said base, a ram projectable through the upper end of said standard and movable toward or away from a mold encasing a dental die supported with respect to said base, a mold splitter removably mounted on the end of said ram, said mold splitter including a pair of chisel-like cutting members separated by a bridge portion, each of said cutting members having a pair of angularly disposed cutting faces adapted to project beyond opposite sides of the dental die for breaking away the material of the mold without injury to the die.

3. Apparatus for making dental amalgam and other dies, comprising a base, a standard connected with said base, a ram projectable through the upper end of said standard and movable toward or away from a mold encasing a dental die supported with respect to said base, a mold splitter, means for removably connecting said mold splitter with one end of said ram, said mold splitter including a pair of chisel-like cutting members spaced one from the other for a distance bridging a dental die for cutting away the material of the mold without injury to the dental die.

4. Apparatus for making dental amalgam and other dies, comprising a base, a standard connected with said base, a ram projectable through the upper end of said standard and movable toward or away from a mold encasing a dental die supported with respect to said base, a mold splitter, a spring pressed ball member disposed in one side of said ram adjacent one end of the ram, means disposed within said mold splitter for engaging said spring pressed ball member and detachably holding the mold splitter in engagement with said ram, and a pair of chisel-like cutting members formed on said mold splitter and spaced from each other a sufficient distance to bridge a dental die for breaking away the material of the mold without injury to the die, the inner faces of said cutting members being angularly disposed for maintaining the space between said members clear of broken material.

5. Apparatus for making dental amalgam and other dies, comprising a base, a standard connected with said base, a reversible ram projectable through the upper end of said standard and movable toward or away from a mold encasing a dental die supported with respect to said base, a spring pressed ball carried in the side of said ram adjacent each end thereof and urged outwardly, a mold splitter having a pair of chisel-like cutting members extending from a socket member, and a circumferentially extending seat being formed in said socket member for receiving the spring pressed ball at either end of said ram and detachably holding the mold splitter in engagement with the ram, the cutting members on said mold splitter being spaced from each other for a distance adapted to bridge the dental die in the mold for breaking the material of the mold away from the dental die without injury to the die, the inner faces of said cutting members each being formed in a vertically disposed double bevel formation for guiding broken material outwardly from between said cutting members.

6. Apparatus for making dental amalgam and other dies comprising a press including a base and a standard rising from said base, an investment ring containing a mold and supported above said base, a ram extending vertically through said standard, one end of said ram being substantially blunt to effect a primary packing of material within the mold, and actuating means for forcing said end of said ram towards said ring for applying a primary packing force to the material within the mold.

7. Apparatus for making dental amalgam and other dies comprising a press including a base and a standard rising from said base, an investment ring containing a mold and supported above said base, a ram extending vertically through said standard, one end of said ram terminating in a rounded portion of a relatively large radius compared with the radius of said ram, and actuating means for forcing said rounded end of said ram towards said ring for applying a primary packing force to the material within the mold.

8. Apparatus for making dental amalgam and other dies comprising a press including a base and a standard rising from said base, an investment ring containing a mold and supported above said base, a ram extending vertically through said standard, one end of said ram being of reduced area to effect a compressing of material within the mold, actuating means for forcing said end of said ram towards said ring for applying a compressing force to the material within the mold, and means for securing said ram under pressure against the material within the mold.

9. Apparatus for making dental amalgam and other dies comprising a press including a base and a standard rising from said base, an investment ring containing a mold and supported above said base, a ram extending vertically through said standard, one end of said ram having a tapered form terminating in a rounded portion of a relatively small radius compared with the radius of said ram, actuating means for forcing said end of said ram towards said ring for applying a compressing force to the material within the mold, and means for yieldably maintaining said ram under pressure against the material within the mold.

WILLIAM B. LEBHERZ.
HARRY J. LEBHERZ.